United States Patent Office 3,314,990
Patented Apr. 18, 1967

3,314,990
SULFUR-CONTAINING BORON COMPOUNDS
Norman E. Miller, Newark, Del., assignor to E. I. du Pont de Nemours and Company, Wilmington, Del., a corporation of Delaware
No Drawing. Filed Sept. 28, 1961, Ser. No. 141,537
17 Claims. (Cl. 260—551)

This invention relates to new boron compounds and to processes for their preparation. More particularly, it relates to new boron compounds having a plurality of boron and hydrogen atoms.

Boron compounds, particularly boron hydrides, have achieved technical importance in recent years. For many potential applications most boron compounds, including boron hydrides, halides and alkyls, have been severely limited by hydrolytic, oxidative and other types of instability. To illustrate, diborane, chlorodiborane, pentaborane and trialkylboron compounds are spontaneously flammable in air. Diborane, pentaborane (9), chlorodiborane, boron trichloride, iododecaborane (14) and most other boron halides are rapidly hydrolyzed in water or alcohol. Other classes of boron compounds, e.g., the borazoles, are hydrolyzed by contact with water. Borazoles have poor thermal stability and they show reducing properties in chemical reactions, e.g., borazoles reduce silver nitrate. Even the most stable known boron hydride, i.e., decaborane (14), is hydrolyzed at a moderate rate in water. Known ionic borohydrides, e.g., tetrahydroborates ($NaBH_4$ and the like), are similarly hydrolyzed at a rapid rate at 100° C.

The growing number of applications for boron compounds has stimulated an intensive study of processes for obtaining a wide range of products, particularly compositions which have a plurality of boron and hydrogen atoms. However, few processes have been disclosed in the art which lead to boron compositions of the desired stability and, in particular, no simple and economical methods for obtaining compositions having nine or more boron atoms per molecule have been disclosed.

This invention is directed to a broad class of boron compounds which have stability characterisics that are unusual among boron compounds. The compounds of the invention generally show hydrolytic, oxidative and chemical stabilities normally associated with aromatic compounds.

The novel boron compounds of the invention consist of 12 conjoined boron atoms of which at least 10 and at most 11 are bonded to hydrogen atoms or to groups capable of bonding to a nuclear carbon which is a member of a benzene ring; the compounds consisting further of at least one and at most two groups which are organic sulfides; any remaining component in said compounds being a group which can form a cation in aqueous solution.

The novel compounds are obtained by heating a sulfide-boron addition compound (organic sulfide-$BH_3$) with a boron hydride of the formula $B_mH_{m+4}$, where $m$ is 2, 5, or 10, to a temperature at which hydrogen is released as a by-product, and contacting the product so obtained with a solution containing a cation, i.e., a positively charged ion. The minimum temperature at which by-product hydrogen is formed in the process is about 50° C.

The compounds obtained in the above process are reacted with an electrophilic reagent in the event it is desired to obtain products having one or more substituents bonded to boron through replacement of hydrogen.

DESCRIPTION OF THE NEW COMPOUNDS

The polyboron compounds of the invention are represented by the following generic formula:

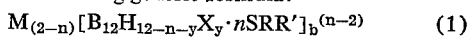  (1)

where M is a cation, i.e., a group carrying one through three positive charges, X is a group which is capable of bonding to nuclear carbon of a carbocyclic aromatic compound in place of hydrogen; $n$ is 1 or 2; $(2-n)$ represents the number of M groups which are present in the compound; $(n-2)$ represents the ionic charge or valence of the group in brackets; $y$ has a value of 0 to $(12-n)$ and $b$ has a value of at least 1 and is otherwise equal to the valence of M; R and R' are each of up to 18 carbon atoms selected from the class consisting of alkyl, cycloalkyl, aryl, aralkyl, and alkaryl, and which are present in the organic sulfide employed as a reactant. These groups will be described more fully in a subsequent paragraph in which the sulfide is discussed.

Inspection of generic Formula 1 shows that the polyboron compounds fall into two broad groups which are based on the values for $n$. For compounds when $n=1$, the ionic charge, represented by $(n-2)$, of the group in brackets becomes $-1$ and the number of cation-forming groups, M, also becomes 1. This subgeneric group is, therefore, represented by the following formula:

$$M[B_{12}H_{11-y}X_y \cdot SRR']_b \quad (2)$$

where M, X, R, R' and b are defined as in Formula 1 and $y$ is a cardinal number of 0 to 11, inclusive.

For compounds where $n=2$, the ionic charge of the group in brackets becomes zero, i.e., the boron entity is electrically neutral and the number of groups, M, also becomes zero. This subgeneric group is represented by the following formula:

$$B_{12}H_{10-y}X_y \cdot 2SRR' \quad (3)$$

where X, R and R' are defined as in Formula 1 and $y$ is a cardinal number of 0 to 10, inclusive.

Compounds of Formulas 1, 2 and 3 in which $y=0$ can be considered to be the parent compounds from which other compounds are obtained by substitution, either directly or indirectly, of hydrogen bonded to boron, employing procedures which will be described later. The unsubstituted compounds which fall within the scope of the group of Formula 1 are represented by the following formula:

$$M_{(2-n)}[B_{12}H_{12-n} \cdot nSRR']_b{}^{n-2} \quad (4)$$

where M, n and b have the meanings described for Formula 1.

The compounds of Formula 4 can be divided into two subgroups which are determined by the value of $n$, as described earlier for compounds of Formula 1. When $n=1$ in Formula 4, the compounds are represented as follows:

$$M[B_{12}H_{11} \cdot SRR']_b \quad (5)$$

where M, b, R and R' are defined as in Formula 1. When $n=2$ in Formula 4, the compounds are represented by the following formula:

$$B_{12}H_{10} \cdot 2SRR' \quad (6)$$

where R and R' have the meanings given earlier and they are, in fact, the groups present in the organic sulfide employed as a reactant.

The novel compounds of the invention have a characteristic boron-containing component or group which in Formulas 3 and 6 is represented by the entire formula. Thus, the boron-containing group can be electrically neutral, i.e., it can have an ionic charge of 0, as in Formulas 3 and 6, or it can have a charge of $-1$, i.e., it can be a monovalent anion as, e.g., in Formulas 2, 4 and 5.

Both boron-containing groups (neutral and monovalent anion) have at least two characteristics in common, viz., (1) the component SRR' and the manner in which it is joined to the boron-containing group, and (2) remarkable and unexpected chemical behavior which resembles in many respects the substitution reactions which aromatic compounds undergo i.e., a chemical behavior which is best described as "aromatic." The term "aromatic" is well recognized in organic chemistry and it is discussed, e.g., in Fuson, "Advanced Organic Chemistry," p. 587, Wiley (1950). These common characteristics will be discussed in the paragraphs which follow. The discussions will include descriptions of the groups SRR', X and M.

The term "boron cage" will be used in the discussions. This term refers to the 12 boron atoms which are present in the compounds of the invention and which are deemed to be joined to form a skeleton-like unit or cage in which each boron atom is adjacent to at least four other boron atoms. The manner in which the boron atoms are linked is not known but the group of which the 12 boron atoms are a part functions as a unit in chemical reactions.

*The Group, SRR'.*—The organic sulfides (also called thioethers) which have the formula SRR' have, as a common property, a structure containing an atom which is capable of donating a pair of electrons to the boron cage to form a stable covalent bond. The nature of R and R', bonded to the sulfur is not critical and these groups can include a wide scope of organic radicals. Thus R and R' can be alkyl, cycloalkyl, aryl, aralkyl, alkaryl, or combinations of these groups. R and R' can be joined to form a ring of which the sulfur is a part, e.g., tetrahydrothiophene. The number of carbon atoms in each of R and R' is not critical. Solely for reasons of availability of sulfides, it is preferred that R and R' be aliphatically saturated hydrocarbon groups of up to 18 carbons and that at most one of R and R' is aryl, i.e., R is aryl or R', and R' is alkyl, cycloalkyl, aralkyl, and the like. In this description "aryl" refers to a group in which a nuclear carbon of a benzene ring is bonded to the sulfur of the organic sulfide. "Aliphatically saturated" means free of ethylenic and acetylenic carbon-to-carbon bonds.

Examples of sulfides which are within the scope of SRR' are as follows: dimethyl sulfide, diethyl sulfide, dipropyl sulfide, dibutyl sulfide, di(isobutyl) sulfide, di(2-ethylhexyl) sulfide, didodecyl sulfide, ethyl octadecyl sulfide, butyl dodecyl sulfide, dicyclohexyl sulfide, di(4-dodecylcyclohexyl) sulfide, ethyl cyclohexyl sulfide, methyl cyclopentyl sulfide, methyl p-tolyl sulfide, ethyl (4-methylcyclohexyl) sulfide, methyl decahydronaphthyl sulfide, and the like.

SUBSTITUTION REACTIONS OF THE BORON-CONTAINING GROUP

Prior to discussing the group X in the preceding generic formula, a brief description of the chemical properties of the compounds of the invention is desirable, particularly the substitution reactions which the compounds undergo in reactions with electrophilic reagents. It is particularly desirable to note at this point that the compounds of the invention in which the boron-containing unit bears hydrogen, electrophilic substituents, or both hydrogen and electrophilic substituents, show much greater chemical stability than many of the known hydrogen-containing boron compositions.

The boron-containing group functions as a unit in many chemical reactions and its behavior suggests that the boron atoms are joined to form a boron cage or boron sphere which, although entirely inorganic in structure, undergoes electrophilic substitution reactions in a manner which resembles the behavior of carbocyclic aromatic compounds, e.g., benzene or naphthalene. More specifically, hydrogens bonded to borons in the compounds represented by Formulas 1 through 6 are replaceable by substituents which can also replace hydrogens bonded to nuclear carbons in benzene or a substituted benzene. This behavior of the boron-containing entity of Formulas 1 through 6 is particularly surprising in view of the inorganic composition of the group. It is this previously unknown "aromatic character" or "aromaticity" of the boron-containing group which leads to many of the novel compounds of this invention. The substituents which replace the hydrogens, and which fall within the scope of X in the formulas of the compounds of the invention, are defined in more detail in the following paragraphs.

*Group X.*—The compounds of Formulas 1, 2 and 3 can contain a component represented as X, which in its broadest aspects, is defined as a group capable of bonding to carbon of an aromatic compound by replacement of hydrogen, e.g., a group capable of bonding to a nuclear carbon of benzene, naphthalene, xylene, and the like. The group X is present in the compounds of the invention when y has a value of at least 1. In a more restricted sense, X is a group derivable from an electrophilic reagent, i.e., a group which can be bonded to carbon of an aromatic carbocyclic compound by direct electrophilic attack to effect substitution of hydrogen bonded to a nuclear carbon. Preferably, X is a halogen or a monovalent group bonded to boron through nitrogen, carbon, oxygen or sulfur, e.g., nitro, amino, carboxyl, alkyl, alkoxy, alkylthio, and the like.

The definition of X, as stated above, is based on the close similarity in chemical substitution reactions between the essentially inorganic boron-hydrogen cage of the compounds of the invention and the classical aromatic carbon-hydrogen rings of organic chemistry. X, therefore, represents a broad range of substituents.

The group X can represent a substituent which is introduced by a direct reaction with the parent compound, i.e., a compound of Formulas 5 or 6, or it can represent a substituent obtained by subsequent chemical modification of a group which has been introduced by direct reaction, e.g., a substituent obtained by reduction, esterification, hydrolysis or amidation of directly introduced groups. Substituents which are introduced by direct reaction are, for convenience, referred to as electrophilic groups and these groups form a preferred class of substituents. Thus, in this preferred group, X is a monovalent electrophilic group which is defined as a group capable of bonding to carbon of a benzene nucleus by reaction of benzene or a substituted benzene (toluene, naphthalene) with an electrophilic reagent. These reagents are defined more fully in later paragraphs.

An electrophilic group, derivable from an electrophilic reagent, is deficient in electrons and has a point of low electron density. Electrophilic groups and reagents which are employed to effect substitution of such groups for the hydrogen on a carbon of a benzene nucleus are described in conventional textbooks of which the following are examples:

Remick, "Electronic Interpretations of Organic Chemistry," p. 532, 100–1, Wiley (1943).

Ingold, "Structure and Mechanism in Organic Chemistry," pp. 198–200, 269–304 (especially pp. 202, 211), Cornell University Press (1953).

Fuson, "Advanced Organic Chemistry," Chap. 1, Wiley (1953).

Wheland, "Advanced Organic Chemistry," 2nd ed., p. 83, Wiley (1949).

Examples of electrophilic groups, i.e., substituents which are derivable from electrophilic reagents, which are included within the scope of X are as follows: halogens (F, Cl, Br, I), hydrocarbon, carboxyl $$(-\overset{O}{\underset{\|}{C}}-OH)$$

carbamyl and N-substituted carbamyl $$(-\overset{O}{\underset{\|}{C}}-NH_2,\ -\overset{O}{\underset{\|}{C}}-NHR_2,\ -\overset{O}{\underset{\|}{C}}-NR_2{}^2)$$

halocarbonyl $$(-\overset{O}{\underset{\|}{C}}-Y$$

where Y is F, Cl, Br, I), halomethyl (—CH$_2$Y', where Y' is F, Cl, Br, I), hydroxy (—OH), hydrocarbyloxy (—OR$^2$), acetal [—CH(OR$^2$)$_2$], ketal [—CR$^2$(OR$^2$)$_2$], hydrocarbylcarbonyloxy [—OC(O)R$^2$], hydrocarbyloxycarbonyl [—C(O)OR$^2$], isocyanate (—NCO), cyanate (—CNO), thiocyanate (—CNS), isothiocyanate (—NCS)

hydrocarbylthio (—SH$^2$), hydroxymethyl (—CH$_2$OH), hydrocarbyloxymethyl (—CH$_2$OR$^2$), dihydrocarbylaminomethyl (—CH$_2$NR$_2^2$), cyano (—CN), amino (—NH$_2$), substituted amino (—NHR$^2$, —NR$_2^2$), triahalomethyl (—CCl$_3$, —CBr$_3$, —CF$_3$, etc.), acyl

aldehyde

nitro (—NO$_2$), nitroso (—NO), azo (—N=N—Ar, where Ar is an aromatic hydrocarbon of up to 10 carbons), sulfo (—SO$_3$H), sulfonyl (—SO$_2$R$^2$), and acetoxymercury

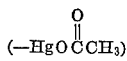

R$^2$, where used in the above substituents, is a monovalent organic group which is preferably a hydrocarbon group (alkyl, cycloalkyl, alkenyl, cycloalkenyl, aryl, alkaryl, aralkyl, and the like) of at most 18 carbons.

Description of M.—The compounds of Formulas 1, 2, 4, and 5 include the group M which is a cation. More explicitly, M is an atom or group of atoms which in aqueous solution forms a positively charged ion. The M preferably has a valence of at most 3, i.e., the valence of M is 1, 2, or 3. The properties of the group M are not critical and this group, therefore, represents a broad range of elements and combinations of elements. To illustrate, M can be hydrogen, hydronium (H$_3$O$^+$), a metal a metal-amine complex, ammonium (NH$_4^+$), hydrazonium (NH$_2$—NH$_3^+$), N-substituted ammonium, N-substituted hydrazonium, S-substituted sulfonium, P-substituted phosphonium, and the like. To illustrate further, M can be lithium, sodium, cesium, beryllium, barium, magnesium, calcium, strontium, lanthanum, manganese, iron, cobalt, copper, zinc, mercury, aluminum, thallium, tin, lead, silver, or any other metal. As further and more specific example, M can be R$^3$NH$_3^+$, R$^3_2$NH$_2^+$, R$^3_3$NH$^+$, R$^3_4$N$^+$, (R$^3$NH—NH$_3$)$^+$, (R$^3_2$N—NH$_3$)$^+$, R$^3_3$S$^+$, R$^3_4$P$^+$,

[Zn(NH$_3$)$_4$]$^{++}$, [Co(NH$_3$)$_6$]$^{+++}$, [Cu(NH$_3$)$_4$]$^{++}$,

[Cu(NH$_2$CH$_2$CH$_2$NH$_2$)$_2$]$^{++}$, and the like. The substituents represented by R$^3$ in the above illustrations are organic groups whose character or nature is not a critical feature of these cation groups. The substituents represented by R$^3$ can be open-chain or closed-chain, saturated or unsaturated or the substituents can be composed of heterocyclic rings of which the nitrogen is a component, e.g., pyridine, quinoline, morpholine, hexamethyleneimine, and the like. Preferably, R$^3$, for reasons of availability of reactants, is a hydrocarbon group of at most 18 carbons.

Examples of representative and specific compounds are given below solely to illustrate the invention and they are not to be considered as limiting the scope of operable compounds:

B$_{12}$H$_{10}$·2S(C$_2$H$_5$)$_2$, B$_{12}$H$_{10}$·2S(C$_3$H$_7$)$_2$
B$_{12}$H$_{10}$·2S(C$_4$H$_9$)$_2$, B$_{12}$H$_{10}$·2S(C$_8$H$_{17}$)$_2$
B$_{12}$H$_{10}$·2S(C$_{12}$H$_{25}$)$_2$, B$_{12}$H$_{10}$·2S(C$_6$H$_{11}$)$_2$
B$_{12}$H$_{10}$·2S(C$_2$H$_5$)(C$_4$H$_9$), B$_{12}$H$_{10}$·2S(CH$_2$C$_6$H$_5$)$_2$
NaB$_{12}$H$_{11}$·S(CH$_3$)$_2$, KB$_{12}$H$_{11}$·S(C$_6$H$_{11}$)$_2$
Al[B$_{12}$H$_{11}$·S(C$_3$H$_7$)$_2$]$_3$·6H$_2$O
Zn[B$_{12}$H$_{11}$·S(CH$_3$)(C$_5$H$_{11}$)]$_2$, Hg[B$_{12}$H$_{11}$·S(C$_8$H$_{17}$)$_2$]$_2$
NH$_2$NH$_3$B$_{12}$H$_{11}$·S(CH$_3$)$_2$ (C$_6$H$_5$)$_2$NNH$_3$B$_{12}$H$_{11}$·S(C$_{18}$H$_{37}$)$_2$
C$_3$H$_7$NH$_3$B$_{12}$H$_{11}$·S(C$_2$H$_5$)$_2$
(C$_6$H$_{11}$)$_2$NH$_2$B$_{12}$H$_{11}$·S(C$_2$H$_5$)(CH$_2$C$_6$H$_5$)
B$_{12}$H$_9$Cl·2S(C$_2$H$_5$)$_2$, B$_{12}$H$_5$Cl$_5$·2S(C$_4$H$_9$)$_2$
B$_{12}$H$_6$Br$_4$·2S(C$_6$H$_{11}$)$_2$, B$_{12}$Cl$_{10}$·2S(C$_3$H$_7$)$_2$
B$_{12}$H$_9$F·2S(CH$_3$)$_2$, B$_{12}$H$_9$I·2S(CH$_3$)$_2$
B$_{12}$H$_9$NO$_2$·2S(C$_3$H$_7$)$_2$, B$_{12}$H$_9$COOH·2S(CH$_3$)$_2$
B$_{12}$H$_9$CH$_3$·2S(CH$_3$)$_2$, B$_{12}$H$_8$(C$_2$H$_5$)$_2$·2S(C$_4$H$_9$)$_2$
B$_{12}$H$_9$NH$_2$·2S(C$_2$H$_5$)$_2$, B$_{12}$H$_9$C(O)CH$_3$·2S(C$_3$H$_7$)$_2$
B$_{12}$H$_8$[C(O)C$_6$H$_5$]$_2$·2S(CH$_2$C$_6$H$_5$)$_2$
B$_{12}$H$_8$(OH)$_2$·2S(C$_4$H$_9$)$_2$, B$_{12}$H$_9$SCH$_3$·2S(CH$_3$)$_2$
NaB$_{12}$H$_{10}$NO$_2$·S(CH$_3$)$_2$, Ba[B$_{12}$H$_6$Cl$_5$·S(C$_2$H$_5$)$_2$]$_2$
Mg[B$_{12}$H$_7$Br$_4$·S(C$_3$H$_7$)$_2$]$_2$
Cr[B$_{12}$H$_{10}$C(O)CH$_3$·S(C$_4$H$_9$)$_2$]$_3$·6H$_2$O
NH$_4$B$_{12}$H$_9$[C(O)C$_6$H$_5$]$_2$·S(C$_6$H$_{11}$)$_2$
(CH$_3$)$_3$(C$_6$H$_5$CH$_2$)NB$_{12}$H$_{10}$NO$_2$·S(C$_4$H$_9$)$_2$
(CH$_3$)$_4$NB$_{12}$Cl$_{11}$·S(CH$_3$)$_2$
(C$_6$H$_5$)$_2$NNH$_3$B$_{12}$H$_7$Br$_4$·S(C$_3$H$_7$)$_2$
(C$_6$H$_{11}$)$_2$NH$_2$B$_{12}$H$_{10}$C(O)OC$_2$H$_5$·S(CH$_3$)$_2$
(CH$_3$)$_2$NNH$_3$B$_{12}$H$_{10}$C(O)NH$_2$·S(C$_{18}$H$_{37}$)$_2$
[Zn(NH$_3$)$_4$][B$_{12}$H$_7$Cl$_4$·S(CH$_3$)$_2$]$_2$
[Co(H$_2$O)$_6$][B$_{12}$H$_8$Br$_3$·S(C$_4$H$_9$)$_2$]$_2$
(CH$_3$)$_3$S[B$_{12}$H$_{11}$·S(CH$_3$)$_2$], (CH$_3$)$_4$P[B$_{12}$H$_{11}$S(C$_4$H$_9$)$_2$]

and the like.

NOMENCLATURE

No official system of naming boron compounds has been adopted at the present time. The nomenclature used herein follows the proposals made by a group of the Committee on Nomenclature of the American Chemical Society Division of Organic Chemistry. These proposals are discussed in (1) a paper presented by G. W. Schaeffer at the American Chemical Society Meeting, San Francisco, California, April 13–18 (1958), (2) a paper presented by K. L. Loening to the Division of Chemical Literature, American Chemical Society Meeting, Chicago, Ill., Sept. 7–12 (1958), and (3) a publication by Patterson, Chemical Engineering News 34, 560 (1956). The nomenclature is also in accordance with the system published in "Nomenclature of Inorganic Chemistry—1957," p. 72, International Union of Pure and Applied Chemistry, Butterworth's Scientific Publications (London), 1959.

Names assigned to non-ionic boron compounds end in "ane" with the number of hydrogens bonded to boron in the parent compound shown in parentheses, e.g., B$_{10}$H$_{14}$ is tetradecahydrodecaborane (14) or, simply, decaborane (14), B$_{12}$H$_{10}$·2S(CH$_3$)$_2$ is bis(dimethylsulfide)decahydrododecaborane(10) or, more simply, bis(dimethylsulfide)dodecaborane(10); and B$_{12}$H$_8$Cl$_2$·2S(CH$_3$)$_2$ is bis(dimethylsulfide) dichlorooctahydrododecaborane(10) or, optionally, bis(dimethylsulfide)dichlorododecaborane-(10). Names assigned to ionic boron compounds end in "ate" with the valence of the boron-containing ion designated in parentheses by numeral and charge sign. Thus, NaB$_{12}$H$_{11}$·S(CH$_3$)$_2$ is sodium dimethylsulfide-undecahydrododecaborate (—1) and NH$_2$NH$_3$B$_{12}$H$_9$Cl$_2$·S(C$_2$H$_5$)$_2$ is hydrazinium diethylsulfide - dichlorononahydrododecaborate(—1).

PROPERTIES AND CHARACTERISTICS OF THE NEW COMPOUNDS

In physical properties the new compounds range from liquid products to solid products which are stable at conventional atmospheric temperatures and pressures. The products normally are colorless or white and, if solid, they are usually crystalline. However, color or other physical characteristics are determined to some extent by the substituent X. In the event X bears a chromophoric group (e.g., the azo group), the compound may be colored.

Many of the compounds dissolve to some extent in water or hydroxylated solvents, e.g., alcohols. The compounds fall into two groups in their behavior in water.

The compounds of Formula 2 are ionic in character, i.e., they behave like salts and form ions in solution. The compounds of Formula 3 are neutral and non-ionic, i.e., they are not salt-like in character and they do not form ions. The ionic group of compounds generally shows greater solubility in water than the non-ionic group of compounds and this difference in solubility is used to effect separation and purification of the groups.

The compounds of the invention are unusually stable thermally and chemically. For example, the compounds of Formulas 5 and 6 react smoothly with halogens with minimum side reactions to form halogen substituted derivatives. The compounds of the invention, represented by Formula 1, are stable in the presence of aqueous solutions of inorganic bases, a property which is unusual for boron compounds.

THE PROCESS

The compounds of Formula 4 are obtained by employing as one reactant, a boron hydride and, as a second reactant, an organic sulfide-borane adduct.

The boron hydrides which are employed as reactants are diborane ($B_2H_6$), pentaborane(9) ($B_5H_9$) and decaborane(14) ($B_{10}H_{14}$). These boron hydrides are commercially available products and they can be used as marketed without special purification.

The organic sulfide-borane addition compounds which are used as the second reactant are of the type described by Burg and Wagner, J. Am. Chem. Soc. 76, 3307 (1954). The addition compounds or adducts contain a characteristic group which is $>S$—$BH_3$. The adducts can contain one or more than one of these characteristic groups. For adducts having only one thioether group, the reactant has the following general formula:

where R and R' are as earlier defined. The R and R' groups in Formula 7 are the R and R' groups which appear in Formulas 1 through 6 and any further description of their groups is repetitive.

Examples of operable organic sulfide-borane adducts are as follows: borane-diethyl sulfide, borane-dioctylsulfide, borane-dioctadecyl sulfide, borane-ethyl methyl sulfide, borane-methyl octyl sulfide, borane-cyclohexyl methyl sulfide, borane-dicyclohexyl sulfide, borane-methyl phenyl sulfide, borane-ethyl naphthyl sulfide, borane-dibenzyl sulfide, borane-tetramethylene sulfide, borane-methyl p-tolyl sulfide and the like. Borane-sulfide adducts can be employed having more than one thio linkage, e.g., borane adducts from 1,3-bis(methylthio)benzene and 1,4-dithiane can be employed.

The borane-organic sulfide addition compounds can be prepared and isolated for subsequent use in the reaction with a boron hydride or the addition compound can be prepared in situ in the reaction chamber in which the process of the invention is conducted. In this mode of operation the addition compound, without purification, is reacted at the desired temperature with a further quantity of diborane or with a different boron hydride, i.e., pentaborane(9) or decarborane(14).

With diborane as the boron hydride, the process is advantageously operated by supplying diborane continuously or in sufficient quantity initially, to the organic sulfide to form the adduct and the polyhydropolyboron compound in one operation. In this mode of operation, the sulfide initially can be at a temperature which is lower than the final reaction temperature, followed by heating the mixture to the desired temperature. The initial temperature at which diborane is supplied is not a critical factor in the process in view of the ease with which the borane-organic sulfide adduct ($BH_3$—$SRR'$) forms. This method of operation falls within the scope of the process of the present invention and it is, in fact a preferred procedure in view of the availability of diborane and thioethers (i.e., organic sulfides) and the simplicity of the operation.

The mechanism of the reaction is not clearly understood. In a batch method of operation diborane and the sulfide are mixed at a convenient temperature, generally not over about 35° C. and at atmospheric pressure or at a pressure which is higher or lower than atmospheric. If desired, the temperature at which the reactants are charged can be as low as —80° C. or lower. The temperature of the mixture is permitted to rise until formation of the adduct occurs. This step, which is preliminary in the process, can be represented by the following equation:

$$2RR'S + B_2H_6 \rightarrow 2RR'S\text{—}BH_3 \qquad (8)$$

In the step represented by Equation 8, no volatile by-products are obtained, i.e., no by-product hydrogen is formed as a result of the reaction. The reaction is solely additive to form a neutral and non-ionic product having only one boron atom per molecule. The adduct, thus formed is heated to an elevated temperature (at least about 50° C.) with a boron hydride which can be diborane (the boron hydride used for preparing the adduct), pentaborane(9) or decaborane(14) until hydrogen is released as a by-product.

The process can also be operated in a continuous manner, for example, by feeding the adduct and the boron hydride into a reaction vessel at the desired temperature and removing the reaction products continuously. The method of operation is not a critical factor in the process.

The products which are obtained from the crude reaction product of the above process by steps to be described later, consist of new groups of polyhydropolyboron compounds and of previously known groups. All of the products contain from 9–12 conjoined boron atoms. Boron compounds which are known in the art and which are obtained in the process include organic sulfide adducts of nonaborane(13), i.e., $B_9H_{13}\cdot SRR'$.

New compounds which are obtained in the process are not only the compounds of Formula 4 which are included in the scope of this invention, but include compounds of the formulas $M_{a'}(B_{12}H_{12})_{b'}$ and $M(B_{11}H_{14})_b$. In these formulas M and b are defined as in Formula 1 and $a'$ and $b'$ are the smallest whole numbers which satisfy equation.

$$b' = \frac{a' \times \text{valence of } M}{2}$$

The reaction which occurs in the process can be represented by the following equations:

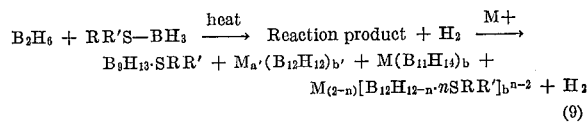

(9)

The groups R and M and the subscripts employed in Equation 9 have the meanings given in previous paragraphs.

The composition in Equation 9 designated as "Reaction product," contains a compound of Formula 4 and an ionic type composition having a water-sensitive cation and a boron-containing anion which contains a plurality of boron atoms. Contacting this reaction product with a protonic liquid, e.g., water, methanol, ethanol or other alcohols, which can contain in solution a compound having the cation M, previously defined, yields one or more ionic type polyhydropolyborates described earlier, having the cation M and including the compounds of Formula 5.

Inspection of Equations 8 and 9 shows that by employing diborane as the boron hydride throughout the process, the organic sulfide and diborane can be reacted and heated to the desired temperature in one step to yield compounds which fall within the scope of Formula 4, i.e., the sulfide and part of the diborane are employed as precursors to form the addition compound of Formula 7 in situ. This procedure is operable for both batch and continuous methods of operation.

Equation 9 shows that hydrogen is a gaseous by-product of the reaction and, as described earlier, the formation of by-product hydrogen is a characteristic feature of the process. The quantity of hydrogen which is formed can be used as an approximate measure of the completeness of the reaction.

The minimum temperature at which the process is operable is, as stated earlier, about 50° C. The respective yields of the products shown in Equation 9 are determined to some extent by the temperature of the reaction. Thus, between about 50° and 100° C. the principal products obtained are the $B_9$ compositions; above about 100° C. the principal products obtained are the $B_{12}$ compounds. The process is, therefore, versatile and permits the preparation of a broad range of polyboron compounds.

The preferred temperature will, of course, vary somewhat with pressure and with the reactivity of the particular organic sulfide-borane adduct and boron hydride reactants which are used. An increase in temperature generally leads to a more rapid rate of reaction. The process is operable at temperatures up to about 400° C. or even higher but excessively high temperatures provide no advantage. Temperatures which lie between about 50° C. and 300° C. are preferred. An especially preferred temperature range lies between about 60° and 200° C. Heating of the reactants can be accomplished by any suitable means. The temperature can be raised by a stepwise procedure or the desired temperature can be reached in one step.

Pressure is not a critical factor in the operation of the process, i.e., the process is operable at subatmospheric, atmospheric and superatmospheric pressure. It is advantageous to maintain the reactants in intimate contact with each other during the process and, for this reason, the process can be conducted profitably under superatmospheric pressure when the reactants which are employed are volatile or have a high vapor pressure at the reaction temperature. Thus, pressures up to 500 atmospheres (absolute) or even higher are operable. Generally, for convenience of operation, a pressure of at least 5 atmospheres is employed with volatile boron hydrides, e.g., diborane, and organic sulfides to maintain good contact between the reactants and thereby obtain good yields of the polyboron compounds. Accurate control of pressure is not necessary and, in the event a closed reaction vessel is employed, the autogenous pressure obtained in the heating step is conveniently used. Pressures above atmospheric can be obtained by any suitable means. The boron hydride can be used in excess, if desired, or it can be mixed with inert gases such as nitrogen, argon, helium, and the like.

The mole ratio in which the reactants are used is not critical. Preferably, the ratio of moles of boron hydride/ moles organic sulfide-borane adduct is at least 1. With diborane and an organic sulfide as reactants, the ratio of moles diborane/moles organic sulfide is preferably greater than 1. To obtain high yields of polyboron compounds, it is desirable although not essential to use the boron hydried in considerable excess, particularly when diborane is employed as the reactant. Thus, with diborane, the ratio of moles $B_2H_6$/moles organic sulfide can be 2, 3, 4, 5, or even higher. The use of excess boron hydride permits maximum utilization of the basic organic sulfide or the organic sulfide-borane adduct. The mole ratio in which the reactants are present in the reaction zone will be determined to a large extent by the method which is used, i.e., whether batch, continuous or a combination of the two methods.

In the operation of the process, a reaction vessel is used whose inner surfaces are made of corrosion-resistant material, e.g., commercially available stainless steels, platinum, glass, and the like. Conventional vessels or pressure-resistant vessels can be employed. The reaction is preferably conducted under substantially anhydrous conditions and the vessel is generally flushed with an inert gas prior to charging with the reactants. It is then charged with the organic sulfide-borane adduct. With diborane as the boron hydride reactant, the vessel is conveniently charged first with the organic sulfide and then with the boron hydride. In the event a pressure vessel is employed, it can be cooled to a low temperature, e.g., with solid carbon dioxide-acetone mixtures, liquid nitrogen, liquid helium, and the like, and it is evacuated to a low pressure to facilitate charging with a volatile boron hydride. Cooling and evacuation are not essential steps, however. The desired quantity of reactants are charged into the vessel and it is closed. Vessel and contents are then heated to the desired temperature with agitation.

To conduct the process at atmospheric pressure, the reaction vessel can be fitted (1) with a gas inlet tube to lead the volatile boron hydride below the surface of the organic sulfide-borane adduct, (2) with a reflux condenser to return boiling liquids to the reaction chamber, and (3) a cold trap (cooled to −80° C. or lower) joined to the reflux condenser to collect volatile products which are formed during the reaction.

With a boron hydride of low volatility, e.g., decaborane (14), the organic sulfide-borane adduct and the boron hydride are simply mixed and heated to reaction temperature, i.e., until rapid release of hydrogen occurs with formation of the desired products.

The procedures described above can be modified or changed as required by convenience or circumstances. It is not essential to conduct the reaction in any particular sequence of steps or by any specific procedure.

Mixing of the reactants during the operation of the process is desirable although not essential. Mixing can be accomplished by any suitable means, e.g., by mechanical stirring, shaking, or tumbling of the entire reactor.

The time of the reaction is not critical. In a batch process, the time will generally lie between about 1 hour and about 50 hours. In general, a reaction time of 5 hours to 25 hours is sufficient for a batch operation. For a continuous process, much shorter reaction times can be used and unreacted components can be recirculated for further exposure in the reaction zone.

In an optional method of operation of the process, the reaction between the boron hydride and the organic sulfide-borane adduct is conducted in the presence of an inert solvent, i.e., a liquid which is not decomposed under the conditions of the reaction by the components of the process or by the products which are obtained. In many cases the adduct is a liquid at the temperature of the reaction and it can serve both as a solvent and reactant. The use of a solvent is not essential for operability and its use is based solely on convenience of operation. Solvents, in the event they are employed, are preferably liquids at the operating temperatures and they are in most cases liquids at prevailing atmospheric temperature. Hydrocarbons are particularly useful as solvents, e.g., n-hexane, cyclohexane, benzene, toluene, and the like.

In working up the reaction products, the volatile by-products are generally removed by passing them into a trap cooled to a very low temperature (e.g., liquid nitrogen temperature). Hydrogen, as stated earlier, is a by-product and it is removed with any other volatile products which may be present. Suitable precautions should be observed in venting reaction vessels in view of possible flammability or toxic hazards of the volatile products.

The crude reaction product which remains in the reaction vessel after removal of volatile material, is usually a syrup or a mixture of liquid and crystalline material. The crude product releases a gas, principally hydrogen, upon exposure to air or when brought into contact with hydroxyl-bearing liquids, e.g., water or alcohol. It is not necessary to exclude air in working up the product. Most conveniently, the crude reaction product is extracted with water or with a hot hydroxyl-bearing solvent such as methyl alcohol, ethyl alcohol, and the like, in which both the ionic and non-ionic types of products are soluble. The non-ionic product [Formula 6] precipitates on cooling the alcoholic solution and it can be separated by conventional methods. The ionic product [Formula 5] which remains in solution is acidic in character and it is most conveniently isolated in the form of a salt by neutralizing the acidic solution with a base. The salt is purified further, if desired, by crystallization from conventional solvents.

PROCESS FOR PREPARING COMPOUNDS HAVING X GROUPS

Compounds of Formulas 1, 2 and 3 in which the value of $y$ is at least 1 are prepared by employing the following reactants:

(a) A compound of Formula 4 which includes the two subgeneric groups represented by Formulas 5 and 6.

(b) A reagent capable of introducing a monovalent substituent, called herein an electrophilic group, into a benzene nucleus by replacement of hydrogen bonded to a carbon of said nucleus. This reactant is referred to as an electrophilic reagent and it is discussed in more detail in the following paragraphs.

For preparation of compounds which bear two or more X groups which are different, e.g., —$SCH_3$ and —Cl, a compound of Formula 1 can be employed as the boron-containing reactant which contains at least one hydrogen and at least one X group bonded to boron atoms.

Electrophilic reagents which are broadly operable in the process are reagents which will effect direct substitution of hydrogen bonded to carbon of a benzene nucleus, i.e., the hydrogen is replaced by a group derived from the electrophilic reagent. Electrophilic reagents are compounds which react by acquiring electrons or acquiring a share in electrons which previously belonged to a foreign molecule (see Ingold, vide supra, p. 201). Examples of electrophilic reagents which are within the scope of the above definition and which are operable in the process of the invention are given below, together with the substituent group which in the process is bonded to boron in the final product.

| Electrophilic Reagent | Electrophilic Group Bonded to Boron |
|---|---|
| Halogens ($F_2$, $Cl_2$, $Br_2$, $I_2$) | Halogen (F, Cl, Br, I) |
| Cyanogen halides (CNF, CNCl) | Nitrile (CN) |
| Sulfuric acid | —$SO_3H$ |
| Nitric acid | —$NO_2$ |
| $FNH_2$ | —$NH_2$ |
| Olefins | —alkyl [e.g., —$C_2H_5$, —$CH(CH_3)_2$] |
| Alkyl halides | —alkyl |
| Acyl halides | $-\overset{O}{\underset{\|}{C}}-R^4$ |
| $Hg(O\overset{O}{\underset{\|}{C}}CH_3)_2$ | $-HgO\overset{O}{\underset{\|}{C}}CH_3$ |
| $(CN)_2C=C(CN)_2$ | —(CN)C=C(CN)$_2$ |
| $HNO_2$ | —NO |
| $COCl_2$ | $-\overset{O}{\underset{\|}{C}}Cl$ |
| CO/HCl | $-\overset{O}{\underset{\|}{C}}H$ |
| $C_6H_5N(CH_3)CHO/POCl_3$ | $-\overset{O}{\underset{\|}{C}}H$ |
| $R^4SO_2Cl$ | —$SO_2$—$R^4$ |
| $R_2^4N\overset{O}{\underset{\|}{C}}Cl$ | $-\overset{O}{\underset{\|}{C}}NR_2^4$ |
| ($R^4OR^4\cdot H$)$^+Cl^-$ (oxonium salt) | $OR^4$ |
| ($R^4OH_2$)$^+Cl^-$ (oxonium salt) | OH or $OR^4$ |
| ($H_3O$)$^+Cl^-$ (hydronium salt) | OH |
| $R^4SCl$ or [$R_2^4SH$]$^+Cl^-$ | $SR^4$ |

In the above groups, $R^4$ is a monovalent organic radical, preferably hydrocarbon of at most 18 carbons, which can be alkyl, alkenyl, cycloalkyl, cycloalkaryl, aryl, alkaryl, aralkyl, and the like.

In the reactions employing the above electrophilic reagents, a catalyst may be used, e.g., aluminum trichloride, boron trifluoride and polyphosphoric acid. These catalysts are employed in the same manner as in the well-known procedures in organic chemistry. In some cases the boron compounds themselves function as catalysts, e.g., in alkylation of compounds of the formua $HB_{12}H_{11}SRR'$.

The electrophilic reagents employed in the process are materials which are usually readily available or which are obtained by conventional methods.

Reaction of the boron compounds of Formulas 5 and 6 with the electrophilic reagent is conducted in conventional vessels with corrosion-resistant inner surfaces, e.g., glass, platinum, poly(tetrafluoroethylene)resin, and the like. The boron-containing reactant, and optionally an inert liquid solvent, is charged into the reaction vessel. The electrophilic reactant is then supplied to the reaction vessel at a temperature and at a rate which will provide a controllable reaction and which will bring the reaction to completion within a reasonable time. When electrophilic reagents are employed which are hydrolytically stable, water or alcohols (methanol, ethanol) can be used conveniently as a solvent for the reaction. Other solvents can be used, for example, diethyl ether, benzene, heptane, carbon tetrachloride, carbon disulfide, and the like.

The temperature at which the reaction is conducted will be determined largely by the reactivity of the electrophilic reagent. In general, the temperature will be between about —20° and 200° C. Preferably, the temperature will be between about 0° and about 150° C.

The time of reaction in a batch process will also depend to a considerable extent on the reactivity of the electrophilic reagent. The reaction generally proceeds rapidly and, with thorough mixing of the reactants, the time may be as low as 5 minutes or even less. Generally a reaction time between about 10 minutes and 5 hours is sufficient. It is desirable and advantageous to mix the reactants by any suitable means although mixing is not essential for operability.

The reaction can be conducted under pressure, if desired, but it is not essential to use pressure. In most cases, the reaction proceeds satisfactorily at atmospheric pressure.

The proportions in which the reactants are used are not critical. It is preferable, in order to obtain maximum yield of desired product, to use at least one mole of the electrophilic reagent for each hydrogen which is to be replaced on the boron-containing reactant. It is not essential, however, that these ratios be used.

The compounds are purified by well-known and recognized procedures. For stable products, conventional crystallization procedures are used, employing water or inert organic solvents, e.g., benzene, alcohol. Solutions of products can be treated with absorptive reagents, e.g., activated carbon or silica gel, to absorb the major portion of the impurities.

*Modification of X groups.*—The X groups introduced by direct reaction of polyhydrododecaborates with electrophilic reagents can undergo further modification by conventional chemical processes, e.g., reduction, esterification, hydrolysis, oxidation, amidation, diazotization, and the like. To illustrate, nitro groups are reduced by hydrogen with a platinum catalyst to amino groups, by nascent hydrogen (from, e.g., iron and hydrochloric acid) to azo and hydrazo groups; carboxy groups are reacted with alcohols to form esters, with ammonia or amines to form amides, with phosphorus halides to form acyl halides; sulfonyl halide groups are reacted with ammonia or amines to form sulfonamides; diazonium halide substituents are coupled with aromatic compounds to form azo-type linkages; etc. These reactions are well-known and fully described in such texts are useful in modifying the X groups in the new compounds of the invention. For a description of organic aromatic reactions, see, for example, Wagner and Zook, "Synthetic Organic Chemistry," John Wiley and Sons, Inc. (1953).

*Metathetic reactions.*—Compounds of Formula (2) wherein M covers a wide range of cations are obtained by simple metathetic reactions employing, e.g., the cesium, triethylammonium, or tetraalkylammonium salts which are readily obtained in the processes described earlier. To illustrate, an aqueous solution of a compound of Formula 2 where M is $(C_2H_5)_3NH^+$ is contacted with a strong acid or with a strongly acidic ion-exchange resin to obtain the free acid, i.e., a compound of Formula 2 in which M is H. The acid, generally in solution, is reacted with oxides of metals, hydroxides of metals, salts of metals (both organic and inorganic), nitrogen bases, sulfonium hydroxides or halides, phosphonium hydroxides or halides, aryldiazonium hydroxides or halides and similar types of compounds to obtain products of Formula 2 which have the desired cation M. In a process employing an ion-exchange resin, strongly acidic resins of the crosslinked polystyrene sulfonic acid variety are preferred because of availability, e.g., "Amberlite IR-120–H" and "Dowex" 50. The acid, so obtained in aqueous solution, can be reacted with nitrates, chlorides, bromides, acetates, benzoates and similar salts of metals or other bases to obtain salts of Formula 2.

Compounds of Formula 2 where M is an alkali or alkaline earth metal, e.g., Na, K, Cs, Ca, Ba, Mg, and Sr, can undergo simple metathetic reactions with other salts to effect an exchange of cations. Thus, $$NaB_{12}H_{11} \cdot SRR'$$

where SRR' is defined in Formula 1, can be reacted in appropriate solvents with ammonium sulfate, benzenediazonium hydroxide, pyridinium chloride, morpholinium sulphate, and the like to form compounds of Formula 2 having ammonium, benzenediazonium, pyridinium, morpholinium, and the like, as cations. These illustrations are not limiting and they demonstrate the breadth of metathetic reactions which can be used.

Compounds of the invention in which the group M is a metal, particularly a transition metal, or a Werner-type complex frequently contain solvent of crystallization when isolated by conventional methods. The solvent, e.g., water, can be bound loosely in the lattices of the crystals or it can be associated by stronger bonds with the metal cation or Werner-type complex cation. Solvent of crystallization, entrapped in crystal lattices, is removed easily by well-known procedures, e.g., heating under reduced pressure. Solvent of crystallization which is associated with the cation is more difficult to remove, and for most applications, it is not necessary to remove completely this type of bound solvent.

The products of the invention and processes for obtaining them are illustrated in the following examples.

*Example 1*

A. A corrosion-resistant pressure vessel (capacity 100 ml.) is evacuated to a pressure of less than 1 mm. of mercury and it is cooled by immersion in a bath of solid carbon dioxide and acetone. The vessel is charged with 3.5 ml. of dimethyl sulfide and 1.8 g. of diborane $(B_2H_6)$. The vessel is closed and it is heated with agitation at 70° C. for 10 hours. The vessel is cooled and volatile products are removed by venting into a vacuum system equipped with a trap immersed in liquid nitrogen. The volatile products contain about 74 millimoles of non-condensable gas (principally hydrogen), 8.2 millimoles of unreacted $B_2H_6$, 11 millimoles of a mixture of $B_5H_9$ and $(CH_3)_2S$ and 17.6 millimoles of $BH_3$—$S(CH_3)_2$.

There remains in the reaction vessel a non-volatile syrup characterized by a nuclear $B^{11}$ magnetic resonance spectrum which consists of a doublet centered at $\delta = 37$ p.p.m. compared to trimethyl borate and the $J_{B-H}$ value is 132 cps.

The syrup is reactive and it releases a gas upon exposure to air. After gas evolution subsides there remains a solid residue which is dissolved in hot aqueous ethanol with a mild evolution of a gas. The solution is acid and, upon cooling, forms a white precipitate which is separated by filtration. The white solid is dimethylsulfide-nonaborane(13), i.e., $B_9H_{13} \cdot S(CH_3)_2$, melting at 110–112° C.

The acidic filtrate is titrated with triethylamine to form a white precipitate which is separated by filtration. The compound is the triethylammonium salt of the anion $(B_{11}H_{14})^-$ and it has the formula $((C_2H_5)_3NHB_{11}H_{14})$. The elemental analysis of this compound is as follows: B, 49.88; C, 30.09; H, 14.10; N, 5.66. The infrared absorption spectrum of the triethylammonium compound in a nujol mull is as follows (exlusive of bands due to triethylammonium and nujol): strong absorption band at $3.95\mu \pm 0.1$, medium absorption band at $9.65\mu \pm 0.1$, and at $9.9\mu \pm 0.1$, and a broad absorption band at $13.85\mu \pm 0.1$.

B. A corrosion-resistant pressure vessel (capacity 400 ml.) is charged, as described in Part A, with 30 ml. of dimethyl sulfide and 20 g. of diborane. The mixture is heated under autogenous process with agitation for 12 hours at 70° C. The volatile products are separated by venting, as described in the preceding part.

The non-volatile product which remains in the reaction vessel is a syrup which is divided into approximately equal portions. These portions are processed further as described below.

One portion of the syrup is added, with minimum exposure to air, to aqueous ethanol. A gas is evolved which is shown by analysis to be principally hydrogen.

A second portion of the syrup is treated with aqueous ethanol. A white solid precipitates which is separated by filtration. The solid is crystallized from methylene chloride-hexane mixture to yield 0.7 g. of dimethylsulfide-nonaborane (13), i.e., $B_9H_{13} \cdot S(CH_3)_2$. The identity of the compound is confirmed by its infrared absorption spectrum and by elemental analysis.

*Analysis.*—Calc'd for $B_9H_{13} \cdot S(CH_3)_2$: B, 56.4; S, 18.6; C, 13.9; H, 11.1. Found: B, 55.05; S, 16.58 C, 14.41, 14.10; H, 11.15, 10.87.

The aqueous alcohol filtrate (obtained above) is acidic and it is titrated with triethylamine. Concentration of the neutralized solution yields 1.3 g. of a triethylammonium salt of the anion $(B_{11}H_{14})^{-1}$ described in Part A.

C. A corrosion-resistant pressure vessel (capacity 400 ml.) is charged, as described in Part A, with a mixture of 30 ml. of dimethyl sulfide and 20 g. of diborane. The mixture is heated with agitation at 70° C. for 12 hours. The volatile reaction products are separated by venting and 36 g. of a colorless oil is obtained which contains a very small quantity of a white solid. The oil is processed as described in Part A and $B_9H_{13} \cdot S(CH_3)_2$ is isolated.

*Example II*

A corrosion-resistant pressure vessel (capacity, 100 ml.) is evacuated to a pressure of less than 1 mm. of mercury and it is cooled by immersing in bath of solid carbon dioxide and acetone. The cooled vessel is charged with 5 ml. of dimethyl sulfide and 1.7 g. of diborane $(B_2H_6)$. The vessel is closed and it is then heated with agitation to 100° C. for 10 hours. At the end of this period the vessel is cooled to prevailing atmospheric temperature (about 25° C.) and the volatile products are removed by venting. There is obtained 0.101 mole of hydrogen in these products. The residue in the vessel is a mixture of crystals and syrup-like liquid. The solid fraction is separated by filtration and 0.73 g. of white crystalline product is obtained which shows the following elemental analysis: C, 21.02; H, 9.09; B, 39.64; S, 26.6.

The filtrate is distilled to yield, as identifiable products, dimethyl sulfide (unreacted) and dimethyl sulfide-borane addition compound, i.e., $BH_3$—$S(CH_3)_2$.

The white crystalline product is boiled in aqueous ethanol to form an acidic solution and an insoluble white solid. The solid is separated from the hot mixture by filtration. The solid is trimethylsulfonium dimethylsulfide-undecahydrododecaborate (1−), i.e., an ionic compound of the formula $[(CH_3)_3S]^+[B_{12}H_{11} \cdot S(CH_3)_2]^-$, where the plus and minus signs show the ionic charges carried by the parts of the molecule within the brackets. The formula for the compound is usually written without the brackets as follows: $(CH_3)_3SB_{12}H_{11} \cdot S(CH_3)_2$. The identity of the compound is confirmed by its infrared absorption spectrum. The characteristic bands for this spectrum are given in a later paragraph.

The hot aqueous ethanol filtrate obtained above is titrated to a pH of 9 with triethylamine. The solution is cooled and an oil separates which crystallizes to a white solid. The solid is separated by filtration to yield 0.095 g. of triethylammonium dimethylsulfide-undecahydrododecaborate (1−), i.e., an ionic compound of the formula $[(C_2H_5)_3NH]^+[B_{12}H_{11} \cdot S(CH_3)_2]^-$, where the plus and minus signs have the meanings given in the preceding paragraph. This compound can also be written simply as $(C_2H_5)_3NHB_{12}H_{11} \cdot S(CH_3)_2$. The identity of the compound is confirmed by elemental analysis and by its infrared absorption spectrum, which is described later.

*Analysis.*—Calc'd for $(C_2H_5)_3NHB_{12}H_{11} \cdot S(CH_3)_2$: B, 42.53; N, 4.60; C, 31.47; H, 10.81. Found: B, 43.02; N, 4.63, 4.74; C, 34.57; H, 11.13.

The infrared absorption spectrum of a nujol mull of $(CH_3)_3SB_{12}H_{11} \cdot S(CH_3)_2$ shows the following bands, exclusive of those which are common with nujol (wavelengths expressed as cm.$^{-1}$): 2500, strong, sharp; 1420, medium, sharp; 1360, weak, sharp; 1330, weak, sharp; 1070, weak, sharp; 1050, weak, sharp; 1005, weak, sharp; 975, medium, sharp; 950, weak, broad; 845, weak, broad; 835, weak, sharp; and 725, medium broad. Some very weak absorption in the 1500–2000 cm.$^{-1}$ region is noted.

The infrared absorption spectrum of a nujol mull of $(C_2H_5)_3NHB_{12}H_{11} \cdot S(CH_3)_2$ shows the following bands, exclusive of those which are common with nujol: 3150, medium, sharp; 2500, strong, sharp; 1410, medium, sharp; 1370, medium, sharp; 1360, medium, sharp; 1320, weak, sharp; 1300, weak, sharp; 1280, weak, sharp; 1170, medium, sharp with weak shoulder at 1180; 1150, medium, sharp; 1070, medium, sharp; 1040, strong, sharp with shoulder at 1030; 1010, medium, sharp; 995, medium, sharp, 965, strong, sharp; 830, medium, sharp; 805, weak, sharp; 790, weak, sharp; 720, strong, broad, with a shoulder at 735.

The compound $(C_2H_5)_3NHB_{12}H_{11} \cdot S(CH_3)_2$ in methanol solution is characterized by a nuclear $B^{11}$ magnetic resonance spectrum which consists of a doublet with high field part of lesser area, centered at $\delta=33$ p.p.m. compared to trimethyl borate, and the $J_{B-H}$ value is 133 cps. The ultraviolet spectrum of the compound shows no absorption.

Example III

A. A corrosion-resistant pressure vessel (capacity, 400 ml.) is evacuated to a pressure of less than 1 mm. of mercury and it is cooled by immersing in a bath of solid carbon dioxide and acetone. The vessel is charged with 30 ml. of dimethyl sulfide and 25 g. of diborane. The vessel is closed and it is heated for 10 hours at 100° C. with shaking. The vessel is cooled and volatile products are removed by venting under reduced pressure. A white solid residue, weighing 21.3 g. remains in the vessel. The solid is boiled in water to which a small quantity of ethanol has been added and a slow evolution of a gas is noted. The material which is insoluble is separated by filtration and the hot aqueous filtrate, which is strongly acid, is set aside for further work.

The insoluble fraction is extracted repeatedly with hot ethanol and the ethanol solutions, on cooling, yield 5.9 g. of bis(dimethylsulfide)dodecaborane(10), i.e., a compound of the formula $B_{12}H_{10} \cdot 2S(CH_3)_2$. The compound bears no charge and it is non-ionic in character. Its identity is confirmed by its infrared absorption spectrum and by elemental analysis. The product is a white, soft, microcrystalline solid which melts at 220–240° C. with decomposition.

*Analysis.*—Calc'd for $B_{12}H_{10} \cdot 2S(CH_3)_2$: B, 49.15; S, 24.27; C, 18.18; H, 8.40. Found: B, 47.27, 47.50; S, 23.54; C, 17.87, 17.52; H, 8.22, 8.66.

The infrared absorption spectrum of $B_{12}H_{10} \cdot 2S(CH_3)_2$ in a nujol mull shows the following bands, exclusive of those common with nujol (expressed as cm.$^{-1}$): 2500, strong, sharp; 1420, medium, sharp, with shoulder; 1330, weak, sharp; 1040, medium, medium; 1005, medium, medium; 970, medium, medium; 860, weak, broad; 812, medium, medium; 730, medium, medium.

The hot aqueous filtrate, obtained above, is cooled and a white solid precipitates. The solid is separated by filtration to yield 0.17 g. of trimethylsulfonium dimethylsulfide-undecahydrododecaborate(1−), i.e., a compound of the formula $(CH_3)_3SB_{12}H_{11} \cdot S(CH_3)_2$. The identity of the compound is confirmed by its infrared absorption spectrum and elemental analysis.

*Analysis.*—Calc'd for $(CH_3)_3SB_{12}H_{11} \cdot S(CH_3)_2$: B, 46.2; S, 22.8; C, 21.4; H, 9.35. Found: B, 46.57; S, 23.08; C, 21.29; H, 9.23.

The cooled filtrate, which remains after separation of the trimethylsulfonium compound, is titrated with triethylamine to yield, as the first solid product, 4.1 g. of triethylammonium dimethylsulfide-undecahydrododecaborate(1−), i.e., $(C_2H_5)_3NHB_{12}H_{11} \cdot S(CH_3)_2$. A second product which separates on concentration of the filtrate yields 1.3 g. of bis(triethylammonium) dodecahydrododecaborate(2−), i.e., a compound of the formula $[(C_2H_5)_3NH]_2B_{12}H_{12}$. Both of these compounds are ionic in character.

The yield of the products, based on the diborane used in the reaction is: $B_{12}H_{11} \cdot S(CH_3)_2^{-1}$ derivatives, 9%; $B_{12}H_{12}^{-2}$ derivatives, 3%; and $B_{12}H_{10} \cdot 2S(CH_3)_2$, 15%.

B. The process as described in Part A is conducted employing varying quantities of dimethyl sulfide with a constant quantity of diborane. The reaction mixture in each case is heated at 100° C. for 10 hours under autogenous pressure. A principal product obtained in each case is $B_{12}H_{10} \cdot 2S(CH_3)_2$ as shown in the following summary:

| Quantity Employed | | Analysis of $B_{12}H_{10} \cdot 2S(CH_3)_2$ | | | | Melting Point of Product, ° C. |
|---|---|---|---|---|---|---|
| $(CH_3)_2S$, ml. | $B_2H_6$, g. | Percent B | Percent S | Percent C | Percent H | |
| 1 | 1.8 | 49.05 | 23.37 | 16.94 | 8.23 | 224–225 |
| 3 | 1.8 | 46.77 | 24.68 | 17.79 | 8.79 | 193–200 |
|   |     |       |       | 17.54 | 8.59 |         |
| 4.7 | 1.8 | 48.37 | 23.75 | 19.33 | 8.82 | 224–230 |

Example IV

A corrosion-resistant pressure vessel (capacity, 400 ml.) is evacuated to a pressure of less than 1 mm. of mercury and it is cooled by immersion in a bath of solid carbon dioxide and acetone. The vessel is charged with 30 ml. of dimethyl sulfide and 20 g. of diborane. The vessel is closed and it is heated with agitation for 10 hours at 150° C. The vessel is cooled and volatile products are removed by venting through a trap cooled with liquid nitrogen and by evacuation to a low pressure. There remains in the vessel 18 g. of a tan-colored semisolid product which solidifies on exposure to air. The product is worked up as described in Example III to yield the following compounds:

$(C_2H_5)_3NHB_{12}H_{11} \cdot S(CH_3)_2$ 5.4 g.; $B_{12}H_{10} \cdot 2S(CH_3)_2$, 10.1 g.; and $(CH_3)_3SB_{12}H_{11} \cdot S(CH_3)_2$ about 0.6 g. The identity of each of these products is confirmed by its infrared absorption spectrum. The identity of $B_{12}H_{10} \cdot 2S(CH_3)_2$ is also confirmed by elemental analysis.

*Analysis.*—Calc'd for $B_{12}H_{10} \cdot 2S(CH_3)_2$: B, 49.15; S, 24.27; C, 18.18; H, 8.40; M.W., 264.18. Found: B, 48.51, 48.29; S, 24.97, 24.83; C, 18.54, 18.60; H, 8.46, 8.39; M.W., 256, 271.

The yields of products, based on the quantity of diborane charged into the reaction are: for $B_{12}H_{11} \cdot S(CH_3)_2^-$ derivatives, 15%; for $B_{12}H_{10} \cdot 2S(CH_3)_2$, 31%.

Examples I through IV illustrate the process of the invention in which the sulfide-borane adduct $(RR'S—BH_3)$ is prepared in situ and it is not isolated prior to reaction with a further quantity of a boron hydride. This process is generic to the preparation of compounds which fall within the scope of Formula 4. The following table shows compounds of Formula 4 which can be obtained by reacting diborane with the named organic sulfides and cation-containing compounds:

remains in the vessel. The liquid is boiled with water and evolution of gas is noted. An oily layer forms which is separated by decantation.

The water layer which is acidic, is filtered and the filtrate is neutralized with an aqueous solution of cesium hydroxide. The white precipitate which forms is separated by filtration and crystallized twice from water to obtain 1.12 g. of cesium di-n-propyl sulfide-undecahydrododecaborate (1-), i.e., $CsB_{12}H_{11} \cdot S(C_3H_7)_2$. The identity of the compound is confirmed by elemental analysis and by the infrared absorption spectrum.

*Analysis.*—Calc'd for $CsB_{12}H_{11} \cdot S(C_3H_7)_2$: Cs, 33.9; C, 18.38; H, 6.43; B, 33.10; S, 8.18. Found: Cs, 31.45; C, 17.66, 17.66; H, 6.51, 6.52; B, 32.76; S, 8.58.

The infrared absorption spectrum of the compound in a nujol mull shows the following bands (expressed as cm.$^{-1}$ and exclusive of bands coincident with nujol): 2500, very strong, sharp; 2000–1600, 4 bands, very weak, broad; 1400, medium, sharp; 1360, weak, sharp; 1340, very weak, sharp; 1290, very weak, sharp; 1230, weak, sharp; 1100, weak, sharp; 1070, medium, sharp; 1050, strong, sharp; 975, medium, sharp; 905, weak, broad; 850, shoulder at 840, medium, sharp; 780, weak, broad; 720, medium, broad, shoulder at 740.

The oily layer, previously separated by decantation, is boiled again with water and separated. It is heated under very low pressure (less than 0.1 mm. Hg) for about 24 hours. The product, which is $B_{12}H_{10} \cdot 2S(C_3H_7)_2$, does not completely crystallize under these conditions. It is soluble in aqueous ethanol and its solution does not reduce the silver ion to free metal.

| Organic Sulfide | M+ Compound | Product |
|---|---|---|
| $(C_2H_5)_2S$ | CsOH | $CsB_{12}H_{11} \cdot S(C_2H_5)_2$ and $B_{12}H_{10} \cdot 2S(C_2H_5)_2$ |
| $(C_4H_9)_2S$ | NaOH | $NaB_{12}H_{11} \cdot S(C_4H_9)_2$ and $B_{12}H_{10} \cdot 2S(C_4H_9)_2$ |
| $C_6H_{11}SCH_3$ | $(CH_3)_2CHCH_2NH_2$ | $(CH_3)_2CHCH_2NH_3B_{12}H_{11} \cdot S(C_6H_{11})(CH_3)$ and $B_{12}H_{10} \cdot 2S(C_6H_{11})(CH_3)$ |
| $(C_8H_{17})_2S$ | $(C_6H_5CH_2)(CH_3)_3NOH$ | $(C_6H_5CH_2)(CH_3)_3NB_{12}H_{11} \cdot S(C_8H_{17})_2$ and $B_{12}H_{10} \cdot 2S(C_8H_{17})_2$ |
| $C_2H_5SC_{18}H_{37}$ | CsF | $CsB_{12}H_{11} \cdot S(C_2H_5)(C_{18}H_{37})$ and $B_{12}H_{10} \cdot 2S(C_2H_5)(C_{18}H_{37})$ |
| $CH_3SC_6H_5$ | $(CH_3)_4NOH$ | $(CH_3)_4NB_{12}H_{11} \cdot S(CH_3)(C_6H_5)$ and $B_{12}H_{10} \cdot 2S(CH_3)(C_6H_5)$ |
| $\overline{CH_2CH_2SCH_2CH_2}$ | CsOH | $CsB_{12}H_{11} \cdot \overline{CH_2CH_2SCH_2CH_2}$ and $B_{12}H_{10} \cdot 2\overline{CH_2CH_2SCH_2CH_2}$ |

The process and products of the invention are further illustrated in Example IV–A.

*Example IV–A*

Using the procedure described in Example III, Part A, a mixture of 24 g. of di-n-propyl sulfide and 10 g. of diborane is heated under autogenous pressure at 150° C. for 10 hours with agitation. The vessel is cooled and volatile products are removed by venting under reduced pressure. A clear viscous liquid weighing about 19.7 g.

*Analysis.*—Calc'd for $B_{12}H_{10} \cdot 2S(C_3H_7)_2$: C, 38.3; H, 10.18; B, 34.45; S, 17.04. Found: C, 37.58; H, 10.34; B, 35.39; S, 17.28.

The adduct, $RR'S—BH_3$, formed as the initial reactant, can, if desired, be separated following its preparation and it can be reacted with $B_5H_9$ and $B_{10}H_{14}$. The following adducts, boron hydrides and cation-containing compounds can be reacted to yield compounds which fall within the scope of Formula 4 as shown under "Product."

| Adduct | Boron Hydride | M+ Compound | Product |
|---|---|---|---|
| $(CH_3)_2S—BH_3$ | $B_5H_9$ | $(CH_3)_4NCl$ | $(CH_3)_4NB_{12}H_{11} \cdot S(CH_3)_2$ and $B_{12}H_{10} \cdot 2S(CH_3)_2$ |
| $(C_6H_{13})_2S—BH_3$ | $B_5H_9$ | $(C_4H_9)NH_2$ | $C_4H_9NH_3B_{12}H_{11} \cdot S(C_6H_{13})_2$ and $B_{12}H_{10} \cdot 2S(C_6H_{13})_2$ |
| $(C_6H_5CH_2)_2S—BH_3$ | $B_{10}H_{14}$ | $NH_2NH_2$ | $NH_2NH_3B_{12}H_{11} \cdot S(CH_2C_6H_5)_2$ and $B_{12}H_{10} \cdot 2S(CH_2C_6H_5)_2$ |
| $(iso-C_3H_7)_2S—BH_3$ | $B_{10}H_{14}$ | $C_6H_5NHNH_2$ | $C_6H_5NHNH_3B_{12}H_{11} \cdot S(iso-C_3H_7)_2$ and $B_{12}H_{10} \cdot 2S(iso-C_3H_7)_2$ |
| $(CH_3C_6H_{10})_2S—BH_3$ | $B_{10}H_{14}$ | $(CH_3)_2NNH_2$ | $(CH_3)_2NHNH_3B_{12}H_{11} \cdot S(CH_3C_6H_{10})_2$ and $B_{12}H_{10} \cdot 2S(CH_3C_6H_{10})_2$ |
| $C_2H_5SC_4H_9$ | $B_{10}H_{14}$ | $(C_6H_5)_4POH$ | $(C_6H_5)_4PB_{12}H_{11} \cdot S(C_2H_5)(C_4H_9)$ and $B_{12}H_{10} \cdot 2S(C_2H_5)(C_4H_9)$ |

This method of operation is illustrated in further detail in Example IV-B.

*Example IV-B*

A reaction vessel (capacity, 200 ml.) is equipped with a reflux condenser, tube for addition of solids, thermometer and magnetic stirrer. Dimethyl sulfide (12 ml.) is charged into the vessel which is immersed in a cooling bath at about −78° C. The vessel is connected to a vacuum pump and the internal pressure is reduced to less than 1 mm. of Hg. Diborane (0.075 mole) is introduced into the cooled vessel to form a slurry containing a crystalline solid by reaction with the sulfide. The vessel is removed from the cooling bath and the reaction mixture is allowed to warm to about 25° C. The slurry melts to form a clear liquid. The pressure in the vessel, which at this point is about 100 mm., is reduced to about 30 mm. by means of the vacuum pump. In this operation excess dimethyl sulfide is removed.

Argon gas is introduced into the vessel to bring the pressure to 1 atmosphere and the vessel is then connected to a wet test meter through a mercury-sealed bubbling unit. The solid addition tube is charged with 4.2 g. of $B_{10}H_{14}$ and a small quantity of the compound is released into the reaction mixture. The mixture is heated with stirring to 50–80° C., a yellow color develops and evolution of gas begins. The temperature of the reaction mixture rises to 101° C. and the mixture refluxes. The remaining $B_{10}H_{14}$ is now added slowly and heating, with stirring, of the reaction mixture is continued for about 4 hours. During this time about 4.5 liters of gas is evolved from the almost colorless solution which contains a small quantity of white solid. The mixture is cooled to about 50–60° C. and it is subjected to reduced pressure to remove volatile products. The non-volatile product is a solid weighing 10.3 g.

A portion (6.1 g.) of the solid is boiled with water until evolution of gas stops. The water-insoluble white solid which forms is separated by filtration from the hot solution. There is obtained 2.1 g. of bis(dimethylsulfide)decahydrododecaborane, i.e., $B_{12}H_{10}\cdot 2S(CH_3)_2$.

The hot filtrate, obtained above, is cooled and the white solid which separates is removed by filtration. There is obtained 0.075 g. of trimethylsulfonium dimethylsulfide-undecahydrododecaborate(1−), i.e., $$(CH_3)_3SB_{12}H_{11}\cdot S(CH_3)_2$$

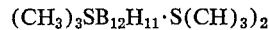

The cold filtrate, which is highly acidic, is neutralized with aqueous CsOH and a white solid precipitates. The solid, which is separated by filtration, is purified by dissolving it in boiling water and slowly cooling the hot solution. There is obtained 2.2 g. of cesium dimethyl-sulfide-undecahydrododecaborate(1−), i.e., $$CsB_{12}H_{11}\cdot S(CH_3)_2$$

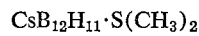

The identity of the compound is confirmed by its infrared absorption spectrum.

A second portion (ca. 0.5 g.) of the crude non-volatile solid obtained in the reaction of $B_{10}H_{14}$ with $BH_3\cdot S(CH_3)_2$ is dissolved in dichloromethane. The solution contains the compound $$[BH_2\cdot 2S(CH_3)_2][B_{12}H_{11}\cdot S(CH_3)_2]$$

i.e., a compound with the novel cation $[BH_2\cdot 2S(CH_3)_2]^+$ and the novel anion discussed earlier. Trimethylamine is bubbled through the solution for 5–10 minutes to convert the cation to $[BH_2\cdot 2N(CH_3)_3]^+$. The solution is divided into two parts and one part, after standing a short time, is filtered. Water and ethanol are added to the filtrate which is then boiled with occasional addition of water until the dichloromethane is removed. The solution is filtered while hot and the filtrate is allowed to cool. A white solid precipitates which is separated by filtration to obtain 0.025 g. of $$[BH_2\cdot 2N(CH_3)_3][B_{12}H_{11}\cdot S(CH_3)_2]$$

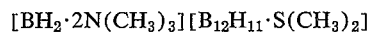

The identity of the compound is confirmed by its infrared absorption spectrum which is as follows (bands expressed as cm.$^{-1}$, obtained in a nujol mull); 2500, strong, sharp; 1480, weak; 1420, medium, sharp; 1350, 1330, 1310, very weak, sharp; 1240, medium, sharp; 1200, shoulder; 1180, medium, sharp; 1120, doublet; 1100, weak, sharp; 1070, weak, sharp; 1050, medium, sharp; 1000, medium, sharp; 975 (shoulder at 985), medium, sharp; 910, medium, sharp; 850 (shoulder at 830), medium, sharp; 910, weak, broad; 745, weak, broad; 720, medium, broad.

The second portion of the dichloromethane solution is mixed with about 1 ml. of water and trimethylamine is bubbled through the mixture. The mixture is processed as described in the preceding paragraph to obtain a further quantity (0.025 g.) of $$[H_2B\cdot 2N(CH_3)_3][B_{12}H_{11}\cdot S(CH_3)_2]$$

*Example V*

The salt $[(C_2H_5)_3NH]B_{12}H_{11}\cdot S(CH_3)_2$ obtained as described in Examples II, III and IV, is dissolved in hot water and the aqueous solution is passed through a column packed with an acid ion-exchange resin ("Amberlite" IR-120H) to yield an aqueous solution of hydrogen dimethylsulfide-undecahydrododecaborate (1−), i.e., $$HB_{12}H_{11}\cdot S(CH_3)_2$$

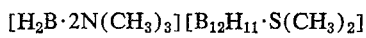

or, in hydrated form, $(H_3O)B_{12}H_{11}\cdot S(CH_3)_2$. The compound is a strong acid and it is not decomposed in boiling water.

The acid, which can be obtained in solid crystalline form by evaporation of the aqueous solution, is used to obtain salts of the monovalent anion, $B_{12}H_{11}\cdot S(CH_3)_2^-$. The acid is conveniently used in aqueous solution. In the crystalline form it generally contains water of hydration.

The process of Example V is generic to the preparation of acids of the invention, i.e., to compounds of the formula $HB_{12}H_{11}\cdot SRR'$. The process is operable with any salt employing either water or alcohols (methanol, ethanol, etc.) as solvents. Solely for reasons of availability, alkali metal, ammonium and substituted ammonium salts are preferred for use in the process. Polymeric acidic ion-exchange resins are most convenient to use to provide a solution of the acid in reasonably pure form. This form of a strong acid is, therefore, preferred for use in the process. However, any strong acid, e.g., a mineral acid, is operable and can be employed. By way of illustration, the process can be used to prepare $HB_{12}H_{11}\cdot S(C_2H_5)_2$ from $NaB_{12}H_{11}\cdot S(C_2H_5)_2$,

$HB_{12}H_{11}\cdot S(C_6H_{11})_2$ from $NH_4B_{12}H_{11}\cdot S(C_6H_{11})_2$ $HB_{12}H_{11}\cdot S(C_{12}H_{25})_2$ from $(C_2H_5)_3NHB_{12}H_{11}\cdot S(C_{16}H_{33})_2$ and $HB_{12}H_{11}\cdot S(CH_2C_6H_5)_2$ from $$C_6H_5NH_3B_{12}H_{11}\cdot S(CH_2C_6H_5)_2$$

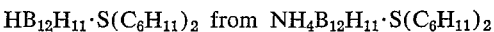

*Example VI*

A. A portion of the aqueous solution of the acid obtained in Example V is neutralized with an aqueous solution of trimethylsulfonium hydroxide, i.e., $$(CH_3)_3SOH$$

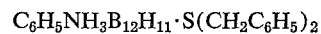

to yield $(CH_3)_3SB_{12}H_{11}\cdot S(CH_3)_2$, a salt which is also obtained directly in the reaction of dimethyl sulfide and diborane. The salt, trimethylsulfonium dimethylsulfide-undecahydrododecaborate(1−) is a transparent, crystalline solid which is soluble in acetone and somewhat less soluble in ethanol. It is sparingly soluble in water and insoluble in methylene dichloride. The salt melts at 232–233° C. with decomposition.

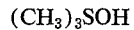

B. A portion of the aqueous solution of the acid obtained in Example V is titrated with an aqueous solution of cesium hydroxide to a pH value of approximately 7. A white crystalline solid separates almost immediately. The mixture is heated and the solid redissolves.

Upon slow cooling, the product which is cesium dimethyl-sulfide-undecahydrododecaborate(1−) separates in transparent, octahedral crystals. The identity of the compound, which has the formula $CsB_{12}H_{11} \cdot S(CH_3)_2$, is confirmed by elemental analysis and by its infrared absorption spectrum.

*Analysis.*—Calc'd for $CsB_{12}H_{11} \cdot S(CH_3)_2$: Cs, 39.56; B, 38.65; S, 9.54; C, 7.15; H, 5.10. Found: Cs, 37.0; B, 38.85; S, 9.58; C, 7.26; H, 5.45.

The infrared absorption spectrum of the compound is a nujol mull shows bands at the following wavelengths, exclusive of those coincident with nujol (expressed as cm.$^{-1}$): 2500, strong, sharp; 1420, medium, sharp; 1370, medium, sharp; 1320, weak, sharp; 1070, weak sharp; 1045, strong, sharp; 995, medium, sharp; 970, strong, sharp; shoulder at 980; 920, weak, sharp; 828, medium, sharp, shoulder at 835; 720, strong, broad.

C. A portion of the aqueous solution of the acid obtained in Example V is treated with an excess of an aqueous solution of tetraaminozinc hydroxide, i.e., $$Zn(NH_3)_4(OH)_2$$

The treated solution is concentrated by evaporation and a pale yellow crystalline solid precipitates. The solid is separated by filtration and it is recrystallized from aqueous ammonia to yield tetraaminozinc dimethylsulfide-undecahydrododecaborate(1−), i.e., $$Zn(NH_3)_4[B_{12}H_{11} \cdot S(CH_3)_2]_2$$

The compound is obtained as pale yellow dendritic crystals. Its identity is confirmed by elemental analysis:

*Analysis.*—Calc'd for $Zn(NH_3)_4[B_{12}H_{11} \cdot S(CH_3)_2]$: C, 8.90; H, 8.59; N, 10.38. Found: C, 9.15; H, 8.81; N, 10.42.

Examples V and VI illustrate the preparation of salts of compounds of Formula 4, employing the free acids as one reactant. This procedure is generic to the preparation of salts and, by way of illustration, the following table provides examples of representative salts which can be obtained:

| Acid | Base | Product |
|---|---|---|
| $HB_{12}H_{11} \cdot S(CH_3)(C_6H_5)$ | $C_6H_5NH_2$ | $C_6H_5NH_3B_{12}H_{11} \cdot S(CH_3)(C_6H_5)$ |
| $HB_{12}H_{11} \cdot S(C_{12}H_{25})_2$ | $\beta$-$C_{10}H_7NH_2$ | $\beta$-$C_{10}H_7NH_3B_{12}H_{11} \cdot S(C_{12}H_{25})_2$ |
| $HB_{12}H_{11} \cdot S(C_{18}H_{37})_2$ | $C_6H_5N(CH_3)_2$ | $C_6H_5(CH_3)_2NHB_{12}H_{11} \cdot S(C_{18}H_{37})_2$ |
| $HB_{12}H_{11} \cdot S(CH_2C_6H_5)_2$ | $(CH_3)_4POH$ | $(CH_3)_4PB_{12}H_{11} \cdot S(CH_2C_6H_5)_2$ |
| $HB_{12}H_{11} \cdot S(CH_3)_2$ | $[Zn(NH_3)_4](OH)_2$ | $Zn(NH_3)_4[B_{12}H_{11} \cdot S(CH_3)_2]_2$ |
| $HB_{12}H_{11} \cdot S(C_3H_7)_2$ | $C_6H_5NHNH_2$ | $C_6H_5NHNH_3B_{12}H_{11} \cdot S(C_3H_7)_2$ |

*Example VII*

A 0.3 g. portion of bis(dimethylsulfide)dodecaborane(10) is dissolved in methylene chloride and a small quantity of anhydrous sodium carbonate is added to the solution. The mixture is stirred and a solution of bromine in methylene chloride is added slowly until the color of bromine persists in the reaction mixture. The mixture is filtered and the clear, pale yellow filtrate is evaporated under reduced pressure to obtain a fluffy orange residue. The solid residue is crystallized from ethanol to yield a total of 0.25 g. of bis(dimethylsulfide)dibromododecaborane(10), i.e., $B_{12}H_8Br_2 \cdot 2S(CH_3)_2$. The identity of the compound is confirmed by elemental analysis and by its infrared absorption spectrum.

*Analysis.*—Calc'd for $B_{12}H_8Br_2 \cdot 2S(CH_3)_2$: Br, 37.9; C, 11.4; H, 4.74; S, 15.1. Found: Br, 38.72; C, 11.99, 12.24; H, 4.95, 4.75; S, 13.98, 14.13.

*Example VIII*

A. A 1.1 g. portion of triethylammonium dimethylsulfide-undecahydrododecaborate(1−), i.e., $$(C_2H_5)_3NHB_{12}H_{11} \cdot S(CH_3)_2$$

is dissolved in methanol and a small quantity of anhydrous sodium carbonate is added to the solution. Liquid bromine is added slowly with vigorous stirring until the rate of disappearance of color due to bromine is very slow.

The reaction generates considerable heat. The solution is filtered and the filtrate is evaporated to yield a white semi-solid residue. Addition of water to the residue forms a brown insoluble oil which does not crystallize. The oil is dissolved in methanol and the solution is passed through a column packed with an acidic ion-exchange resin ("Amberlite" IR–120H) to yield a highly acidic eluate which contains the acids $HB_{12}H_8Br_3 \cdot S(CH_3)_2$ and $HB_{12}H_7Br_4 \cdot S(CH_3)_2$ in approximately equimolar ratios as shown below.

B. A portion of this acidic eluent is titrated to a pH of about 7 with an aqueous solution of trimethylsulfonium hydroxide. The solid which precipitates is separated by filtration and it is crystallized from aqueous-ethanol solution to yield a nearly white crystalline solid which is an approximately equimolar mixture of the following compounds: $(CH_3)_3SB_{12}H_8Br_3 \cdot S(CH_3)_2$ and $$(CH_3)_3SB_{12}H_7Br_4 \cdot S(CH_3)_2$$

These compounds are called trimethylsulfonium dimethyl-sulfide-tribromooctahydrododecaborate (1−) and trimethylsulfonium dimethylsulfide-tetrabromoheptahydrododecaborate (1−). The compounds are sparingly soluble in water.

*Analysis.*—Calc'd for an equimolar mixture of tribromo and tetrabromo compounds: S, 11.52; Br, 50.57; C, 10.79; H, 4.08; B, 23.34. Found: S, 12.08; Br, 49.45; C, 11.30, 10.93; H, 4.21, 4.18; B, 23.40.

The infrared absorption spectrum of the product in a nujol mull shows the following bands, exclusive of those coincident with nujol (expressed as cm.$^{-1}$): 2500, strong, sharp; 1410, strong, sharp; 1340, weak, sharp; 1320, very weak, sharp; 1030, strong, sharp; 990, medium, sharp; 940, strong, broad; 860, medium, broad; 820, medium, broad; 800, medium, broad; 770, medium, sharp; 730, weak, broad.

C. A second portion of the acidic eluate is titrated to a pH of about 7 with aqueous cesium hydroxide. The resulting salt is processed as described in Part B to yield an equimolar mixture of $CsB_{12}H_8Br_3 \cdot S(CH_3)_2$ and $$CsB_{12}H_7Br_4 \cdot S(CH_3)_2$$

These compounds are white crystalline solids which have fair solubility in water. The identity of the product as an equimolar mixture of the two compounds is confirmed by elemental analysis.

*Analysis.*—Calc'd for an equimolar mixture of tribromo and tetrabromo compounds: S, 5.24; Br, 45.60; C, 3.92; H, 2.22; B, 21.71; Cs, 21.71. Found: S, 5.19, 5.08; Br, 46.08; C, 4.56, 4.26; H, 2.48, 2.40; B, 20.73; Cs 20.2, 20.4.

The infrared absorption spectrum of the product in a nujol mull shows the following bands, exclusive of those coincident with nujol (expressed as cm.$^{-1}$): 2500, strong, sharp; 1410, strong, sharp; 1320, weak, sharp; 1030, strong, sharp; 990, medium, sharp; 940; strong, broad; 860, medium, broad; 820, strong, broad; 800, strong, broad, shoulder at 780; 735, weak, broad.

D. A portion of acidic eluate is titrated to a pH of about 7 with tetramethylammonium hydroxide solution. The solid product which is obtained is crystallized from water-ethanol solution to obtain an approximately equimolar mixture of $(CH_3)_4NB_{12}H_8Br_3 \cdot S(CH_3)_2$ and $$(CH_3)_4NB_{12}H_7Br_4 \cdot S(CH_3)_2$$

These compounds have limited solubility in water.

*Analysis.*—Calc'd for an equimolar mixture of tribromo and tetrabromo compounds: S, 5.80; Br, 50.54; C, 13.82; H, 4.64; B, 23.47. Found: S, 5.64, 5.76; Br, 50.69; C, 13.24, 13.57; H, 4.82, 4.62; B, 23.23.

The infrared absorption spectrum of the compound in a nujol mull shows the following bands, exclusive of those coincident with nujol (expressed as cm.$^{-1}$): 2500, strong, sharp; 1480, strong, sharp; 1420, strong, sharp; 1320, weak, sharp; 1040, medium, sharp; 995 medium, sharp; 950, strong, broad; 870, medium, broad; 830, medium, broad; 800, medium, broad; 780, medium, broad; 740, weak, broad; and 680, weak, broad.

*Example IX*

A reaction vessel is charged with 3 g. of $$B_{12}H_{10} \cdot 2S(CH_3)_3$$

and 50 ml. of sym.-tetrachloroethane. Liquid bromine is added to the solution slowly and with vigorous stirring until no more bromine is absorbed. The reaction generates considerable heat. When the vigor of the reaction has subsided, excess bromine is added and the mixture is heated to 130–135° C. for 10 minutes. The solution is cooled and filtered. Carbon tetrachloride is added to the filtrate to precipitate a white solid. The solid is separated and recrystallized from a mixture of carbon tetrachloride and dichloromethane to obtain bis(dimethylsulfide)tetrabromohexahydrododecaborane(10).

*Analysis.*—Calc'd for $B_{12}H_6Br_4 \cdot 2S(CH_3)_2$: C, 8.3; B, 22.4; S, 11.05; Br, 55.2. Found: C, 8.0; B, 18.8; S, 9.2; Br. 56.6.

*Example X*

A reaction vessel is charged with 2.4 g. of $$B_{12}H_{10} \cdot 2S(CH_3)_2$$

and 50 ml. of sym.-tetrachloroethane. The solution is heated to 60° C. and chlorine gas is bubbled through it. The reaction is exothermic and gummy solids separate from the mixture. When the reaction subsides, passage of chlorine is continued and the mixture is heated to 144° C. for a period of about 15 minutes. The solution is cooled and filtered to separate the solid product. The solid is recrystallized from a hot mixture of acetonitrile, carbon tetrachloride and methanol. The compound so obtained is bis(dimethylsulfide)tetrachlorohexahydrododecaborane(10).

*Analysis.*—Calc'd for $B_{12}H_6Cl_4 \cdot 2S(CH_3)_2$: C, 11.9; Cl, 35.3; B, 32.4; S, 15.9. Found: C, 12.0; Cl, 36.2; B, 31.4; S, 15.9.

*Example XI*

A reaction vessel is charged with 2.0 g. of $$B_{12}H_{10} \cdot 2S(CH_3)_2$$

30 ml. of dichloromethane and 30 ml. of chloroform. The mixture is stirred and 13.0 g. of iodine monochloride (ICl) is added. The mixture is refluxed for 12 hours and it is then heated on a steam bath until nearly dry. The solid residue is mixed with water and potassium iodide, and filtered. This step is repeated until the filtrate is at most only light yellow in color. The solid which remains is dried. It is shown by elemental analysis to be principally bis(dimethylsulfide)heptaiodotrihydrododecaborane(10), i.e., $B_{12}H_3I_7 \cdot 2S(CH_3)_2$. The elemental analysis of the product is as follows: I, 68.4; B, 11.2; C, 8.4; S, 5.6.

Examples VII–XI illustrate compounds of the invention in which the substituent X in Formula 1 is a halogen. Compounds in which X is fluorine are obtained by employing elemental fluorine as the fluorinating agent. The procedures illustrated in these examples are generic to the preparation of halogen-bearing compounds of the invention having up to 11 halogens as substituents.

The halogen substituents on the compounds need not necessarily be alike. To illustrate, the compound $$B_{12}H_{10} \cdot 2S(CH_3)_2$$

can be chlorinated to form, for example, $$B_{12}H_5Cl_5 \cdot 2S(CH_3)_2$$

The latter compound can then be brominated to form $B_{12}Br_5Cl_5 \cdot 2S(CH_3)_2$. In a similar manner, $$B_{12}H_{10} \cdot 2S(CH_3)_2$$

can be fluorinated to form $B_{12}H_7F_3 \cdot 2S(CH_3)_2$. This compound is then reacted with ICl to form $$B_{12}H_4F_3I_3 \cdot 2S(CH_3)_2$$

*Example XII*

A mixture consisting of 1.5 g. of $B_{12}H_{10} \cdot 2S(CH_3)_2$, 20 ml. of benzoyl chloride and 0.1 g. of $AlCl_3$ is heated at 80° C. for 15 minutes and at 190° C. for 1 minute. The mixture is cooled, n-hexane is added with stirring, and the solid which forms is separated by filtration. The solid is purified by dissolving in dichloromethane, reprecipitating by adding ether, dissolving again in chloroform and reprecipitating again with ether. The product is dried to obtain a white crystalline compound which is bis(dimethylsulfide)benzoylnonahydrododecaborane(10).

*Analysis.*—Calc'd for $B_{12}H_9C(O)C_6H_5 \cdot 2S(CH_3)_2$: C, 32.6; S, 17.4; B, 35.3. Found: C, 31.6; S, 18.2; B, 36.5.

Example XII illustrates compounds of the invention in which X is a carbacyl group. The process is generic to the preparation of carbacyl-substituted compounds of Formula 1. To illustrate $B_{12}H_{10} \cdot 2S(CH_3)_2$ can be reacted with $CH_3C(O)Cl$ to form $$B_{12}H_8[C(O)CH_3]_2 2S(CH_3)_2$$

with $CH_3(CH_2)_{10}C(O)Cl$ to form $$B_{12}H_9C(O)(CH_2)_{10}CH_3 \cdot 2S(CH_3)_2$$

and with $C_6H_{11}C(O)Cl$ to yield $$B_{12}H_9C(O)C_6H_{11} \cdot 2S(CH_3)_2$$

Compounds in which X in Formula 1 is $-NO_2$ are obtained by employing conventional nitration procedures used for aromatic compounds. The nitrating agent ($HNO_3$) and a salt of the formula $MB_{12}H_{11} \cdot SRR'$, where M is preferably an alkali metal can be mixed in aqueous solution at low temperature, e.g., 0–10° C., to obtain compounds having one or more nitro substituents.

Compounds in which X of Formula 1 is a hydrocarbon are obtained by reacting an acid of Formula 4, i.e., $HB_{12}H_{11} \cdot SRR'$, with an olefinic or acetylenic reactant. To obtain products having ethyl groups, ethylene is employed as a reactant; to obtain compounds in which X is isobutyl, isobutylene is employed as a reactant; to obtain compounds in which X is styryl, phenylacetylene is employed; for vinyl substituted compounds, acetylene is used as a reactant.

Carbonylation of the compounds of Formula 4 yields products in which X of Formula 1 is $-COOH$, e.g., $B_{12}H_9COOH \cdot 2S(CH_3)_2$. This class of products can be neutralized with inorganic or organic bases to yield salts, e.g.

$$B_{12}H_9COONa \cdot 2S(CH_3)_2$$

$$B_{12}H_9COONH_4 \cdot 2S(CH_3)_2$$

$$B_{12}H_9COONH_3C_6H_5 \cdot 2S(CH_3)_2$$

and the like.

As shown above, the $B_{12}H_{10} \cdot 2SRR'$ compounds and the compounds having the $B_{12}H_{11} \cdot SRR'$ anion undergo substitution reactions broadly by employing techniques which are appropriate for effecting hydrogen substitution reactions on carbons of a benzene nucleus. Thus, compounds of the formula $M(B_{12}H_{11} \cdot SRR')_b$ can be reacted (1) with sodium nitrite in acid solution to form nitroso-substituted ($-NO$) compounds, (2) with sulfonating agents to form sulfo-substituted (—SO₃H) compounds, (3) with acyl halides to form acyl-substituted

derivatives, (4) with sulfonyl halides to form derivatives having RSO₂⁻ substituents, (5) with aryldiazonium chlorides to form derivatives having arylazo substituents (—N=N—R), (6) with phosgene to form derivatives having —COCl substituents, (7) with formaldehyde and HCl to form compounds having —CH₂Cl substituents, and (8) with CNCl to obtain compounds having —CN substituents.

UTILITY

The compounds of the invention are useful in many diverse fields. All of the compounds represented by Formula 1 are generically useful as combustible components of fireworks compositions to impart a pleasing color and sparkle to the display.

The compounds of the invention are generically useful as impregnating agents for cellulosic products in the preparation of resistors. To illustrate, a length of cotton string is immersed in a nearly saturated solution of B₁₂H₁₀·2S(CH₃)₂ in acetone. The string is withdrawn from the solution and the solvent is removed by air-drying. A free flame is applied to the dried impregnated string and it burns freely at a rate about 20% faster than an unimpregnated control string. The residue from the impregnated string, after burning, has a size and shape similar to the original string and the residual skeleton is of sufficient coherence to permit embedding in paraffin. The section of residue, so treated, shows a resistance of about 20,000–30,000 ohms/inch. The residue from the control section of string is very small and shapeless and it cannot be handled.

In the group of compounds which fall within the scope of Formula 2, the component M represents a range of groups which are readily interchangeable by metathetic reactions as described earlier. All of the salts which fall within the scope of Formula 2 can be used to prepare the group of acids represented generically as

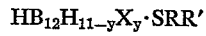

or, in aqueous solution, as

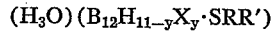

by passing aqueous or alcoholic solutions of the salts through an acidic ion-exchange resin as described earlier. The acids of this group are strong acids and they are useful in industrial applications where it is desired to avoid contamination from sulfate, chloride, bromide, chlorate, phosphate, and like strong acid anions. Thus, the acids of Formula 2, where M is H (or H₃O⁺) are useful for etching metals, such as steel, and for rust removal, for pickling, for scale removal and for similar metal processing operations.

The acids are useful as catalysts in the preparation of esters, e.g., in the reaction of alcohols and organic carboxylic acids, to improve the yields of the desired esters. The acids of the invention are employed for this purpose in the same manner as p-toluenesulfonic acid, sulfuric acid or alcoholic hydrogen chloride.

The acids and many of the salts, particularly the alkali metal and alkaline earth metal salts, are useful as sequestering agents for heavy metals. Thus, a mixture of hydrocarbons in the boiling range of gasoline which contains a copper salt of an organic acid (copper stearate), is thoroughly agitated with aqueous ammoniacal solutions of any of the alkali metal or alkaline earth metal salts of the compounds of Formula 2, e.g.

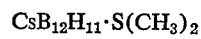

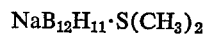

and the like. The hydrocarbon layer, which is separated from the aqueous reagent, is completely free of deleterious copper salt.

The new compounds, particularly the acids, alkali metal, alkaline earth metal and ammonia salts, are useful as sequestering agents for metals in aqueous media. Thus, copper, nickel, cobalt, zinc and cadmium are removed from aqueous solutions of salts containing these metals by mixing the solutions with ammoniacal solutions of the acids and alkali metal, alkaline earth metal and ammonium salts.

The substituted ammonium salts and, in general, all of the nitrogen-base salts as well as phosphonium and sulfonium salts are useful in the field of sequestering agents to remove undesirable metals from aqueous or hydrocarbon media, e.g., (CH₃)₄NB₁₂H₁₁·S(CH₃)₂,

and the like.

The silver salts, i.e., the compounds of Formula 2, where M is Ag, are sensitive to light and they are useful in the photographic arts. To illustrate, the cesium salt, CsB₁₂H₁₁·S(CH₃)₂, is reacted with silver nitrate to obtain AgB₁₂H₁₁·S(CH₃)₂. An alcoholic solution of the silver salt is prepared in subdued light and a strip of pure cellulose sheet is immersed to half its length in the solution. The strip is removed and dried in the absence of light. When exposed to light the treated portion of the strip turns dark, while the untreated portion is not affected.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula

wherein

M is a cation of valence 1–3;

X is bonded to boron and is a monovalent group which is capable of bonding to nuclear carbon of a carbocyclic aromatic compound in place of hydrogen, and is (1) a group derived from an electrophilic reagent by direct attack on the boron cage, or (2) is a group derived by modification of the group in (1) by reduction, esterification, hydrolysis, oxidation, amidation, or diazotization;

R and R′ are monovalent substituents on sulfur of up to 18 carbon atoms and are selected from the class consisting of alkyl, cycloalkyl, aryl, aralkyl and alkaryl;

n is an integer of 1 through 2;

(2—n) represents the number of M cations present in the compound;

(n—2) represents the ionic charge of the group in brackets;

y is a cardinal number of 0 through (12—n); and b is at least 1 and is equal to the valence of M.

2. A compound of claim 1 wherein n is 1, and y is a cardinal number of 0 to 11, inclusive.

3. A compound of claim 1 wherein n is 2, y is a cardinal number of 0 to 10, inclusive, and b is 1.

4. A compound of claim 1 wherein y is zero.

5. A compound of claim 1 wherein n is 1, and y is zero.

6. A compound of claim 1 wherein n is 2, y is zero, and b is 1.

7. A compound of claim 1 wherein X is selected from the group consisting of halogen and monovalent acyl substituents of the formula R²C(O) wherein R² is hydrocarbon of up to 18 carbon atoms.

8. A compound of claim 2 wherein X is selected from the group consisting of halogen and monovalent acyl substituents of the formula R²C(O) wherein R² is hydrocarbon of up to 18 carbon atoms.

9. A compound of claim 3 wherein X is selected from the group consisting of halogen and monovalent acyl substituents of the formula R²C(O) wherein R² is hydrocarbon of up to 18 carbon atoms.

10. The compound of claim 1 having the formula $(C_2H_5)_3NH[B_{12}H_{11} \cdot S(CH_3)_2]$.

11. The compound of claim 1 having the formula $B_{12}H_{10} \cdot 2S(CH_3)_2$.

12. The compound of claim 1 having the formula $(CH_3)_3S[B_{12}H_{11} \cdot S(CH_3)_2]$.

13. The compound of claim 1 having the formula $B_{12}H_{10} \cdot 2S(C_3H_7)_2$.

14. The compound of claim 1 having the formula $Cs[B_{12}H_{11} \cdot S(CH_3)_2]$.

15. In a process for the formation of a compound of the formula $$M_{(2-n)}[B_{12}H_{12-n} \cdot nSRR']_b^{(n-2)}$$

wherein
M is a cation of valence 1–3;
R and R' are monovalent substituents on sulfur of up to 18 carbon atoms and are selected from the class consisting of alkyl, cycloalkyl, aryl, aralkyl and alkaryl;
$n$ is an integer of 1 through 2;
$(2-n)$ represents the number of M cations present in the compound;
$(n-2)$ represents the ionic charge of the group in brackets; and
$b$ is at least 1 and is equal to the valence of M,
the step which comprises reacting a boron hydride selected from the class consisting of $B_2H_6$, $B_5H_9$, and $B_{10}H_{14}$ with an adduct of the formula $RR'S \cdot BH_3$ wherein R and R' are defined as above, at a temperature of at least 50° C.

16. The step of claim 15 in which said adduct is prepared in situ by reacting RR'S with diborane at a temperature lower than that required to effect formation of the final product.

17. Process for preparing a compound of the formula $$M_{(2-n)}[B_{12}H_{12-n-y}X_y \cdot nSRR']_b^{(n-2)}$$

wherein
M is a cation of valence 1–3;
X is bonded to boron and is a monovalent group which is capable of bonding to nuclear carbon of a carbocyclic aromatic compound in place of hydrogen, and is (1) a group derived from an electrophilic reagent by direct attack on the boron cage, or (2) is a group derived by modification of the group in (1) by reduction, esterification, hydrolysis, oxidation, amidation, or diazotization;
R and R' are monovalent substituents on sulfur of up to 18 carbon atoms and are selected from the class consisting of alkyl, cycloalkyl, aryl, aralkyl and alkaryl;
$n$ is an integer of 1 through 2;
$(2-n)$ represents the number of M cations present in the compound;
$(n-2)$ represents the ionic charge of the group in brackets;
$y$ is a cardinal number of 1 through $(12-n)$; and
$b$ is at least 1 and is equal to the valence of M,
which comprises reacting a compound of the above formula wherein $y$ is 0 with a reagent capable of introducing an electrophilic group into a benzene nucleus by replacement of hydrogen bonded to a carbon of said nucleus.

References Cited by the Examiner

Burg et al.: J. Am. Chem. Soc., vol. 76, pages 3307–3310 (1954).

Pitochelli et al.: J. Am. Chem. Soc., vol. 82, pages 3228–9 (1960).

Miller et al.: J. Am. Chem. Soc., vol. 84, pages 1056–1057 (1962).

WALTER A. MODANCE, *Primary Examiner.*

LEON D. ROSDOL, *Examiner.*

L. A. SEBASTIAN, H. I. MOATZ, J. D. RANDOLPH,
*Assistant Examiners.*